United States Patent [19]

Nozawa et al.

[11] Patent Number: 5,120,341
[45] Date of Patent: Jun. 9, 1992

[54] METHOD FOR MANUFACTURING A GLASS CONTAINER HAVING A LARGE IMPACT STRENGTH USING PERMANENT AND NON PERMANENT COATINGS ON THE APPARATUS

[75] Inventors: Mitsuru Nozawa, Nagoya; Makio Nomura, Bisai; Akihiko Takaba, Nagoya; Masato Hayashi, Minokamo, all of Japan

[73] Assignee: Ishizuka Garasu Kabushiki Kaisha, Nagoya, Japan

[21] Appl. No.: 656,875

[22] Filed: Feb. 19, 1991

[30] Foreign Application Priority Data

Feb. 20, 1990 [JP] Japan .................................. 2-38985
Apr. 9, 1990 [JP] Japan .................................. 2-93480
Apr. 16, 1990 [JP] Japan .................................. 2-99966
Oct. 1, 1990 [JP] Japan .................................. 2-260641

[51] Int. Cl.$^5$ .................... C03B 9/193; C03B 11/06
[52] U.S. Cl. .......................................... 65/26; 65/76; 65/79; 65/169; 65/374.11; 65/374.15; 65/24; 65/362
[58] Field of Search ............... 65/362, 374.11, 374.12, 65/374.13, 168, 24, 26, 169, 170, 79, 374.15, 76

[56] References Cited

U.S. PATENT DOCUMENTS

| | | |
|---|---|---|
| 4,164,402 | 7/1979 | Watanabe . |
| 4,251,254 | 2/1981 | Klomp .............................. 65/374.13 |
| 4,578,099 | 3/1986 | Hubner ............................ 65/26 |
| 4,648,893 | 3/1987 | Roux ................................ 65/26 |
| 4,806,137 | 2/1989 | Virey ............................... 65/24 |
| 4,806,139 | 2/1989 | Cartier ............................ 65/26 |
| 4,830,655 | 5/1989 | Franek et al. ................... 65/374.13 |
| 4,993,722 | 1/1985 | Ono .................................. 65/308 |
| 5,006,321 | 4/1991 | Dorfman .......................... 427/192 |

FOREIGN PATENT DOCUMENTS 2111634 4/1990 Japan .

OTHER PUBLICATIONS

"Metal Data Book", Japan Society of Metallurgical Engineers, Marusen Corporation, Material A, Jan., 1984.
Material B, "State of the Art", Stoody Deloro Stellite, Inc., Jun., 1987.
Nikkon Kogyo Newspaper Company, "Spray Handbook", Japan Spray Association, Material C, May, 1964.
Kyoritsu Publication Company, "Eddition Association for Chemical Encyclopedia", Material D, Nov. 1963.
Showa Denko, "Sales Technical Bulletin", Plasma Fluxing Material, Material for Sales, E-10-2, Ceramics Series Fluxing Alloy, Material F.
Showa Denko k.k., "Test Results", Nov. 30, 1987, To: Ishizuka Garasu U.K., Composition Analysis, Material G.

*Primary Examiner*—Kenneth M. Schor
*Assistant Examiner*—John Hoffmann
*Attorney, Agent, or Firm*—Cushman, Darby & Cushman

[57] ABSTRACT

A method for manufacturing a glass container by the steps of (a) providing a plunger with two portions, one portion having a sprayed metal coating of self-fluxing alloy and the second portion having a ceramic coating, (b) forming a lubrication carbon layer on surfaces of molds including a blank mold and a neck ring by periodically injecting flames of at least one kind of gaseous hydrocarbon having a carbon to hydrogen ratio more than 0.75, (c) supplying a gobbet of glass to the blank mold; (d) producing the parison from the gobbet of glass, using the plunger, the blank mold and the neck ring; and (e) blow-forming the parison to a glass container of a final configuration.

12 Claims, 7 Drawing Sheets

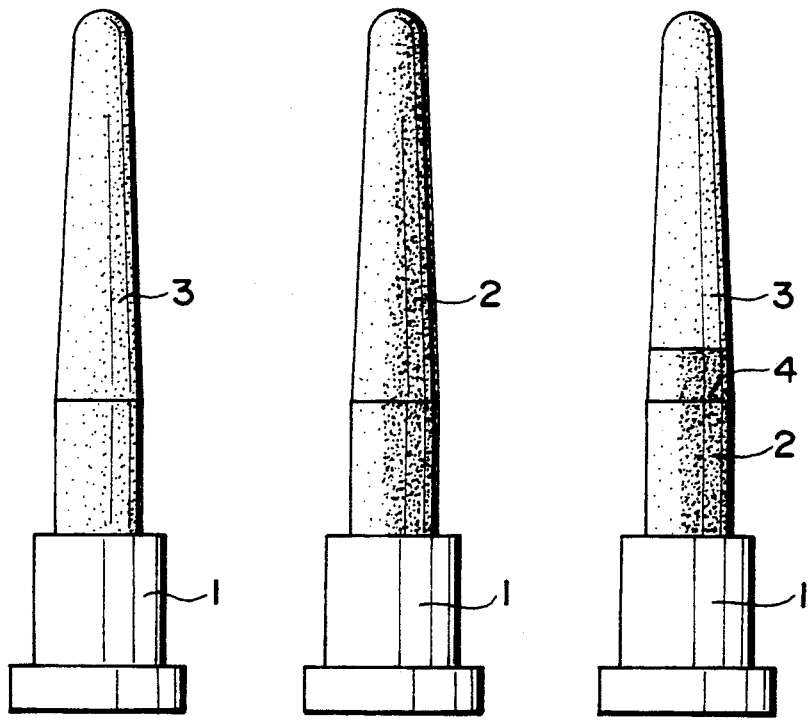

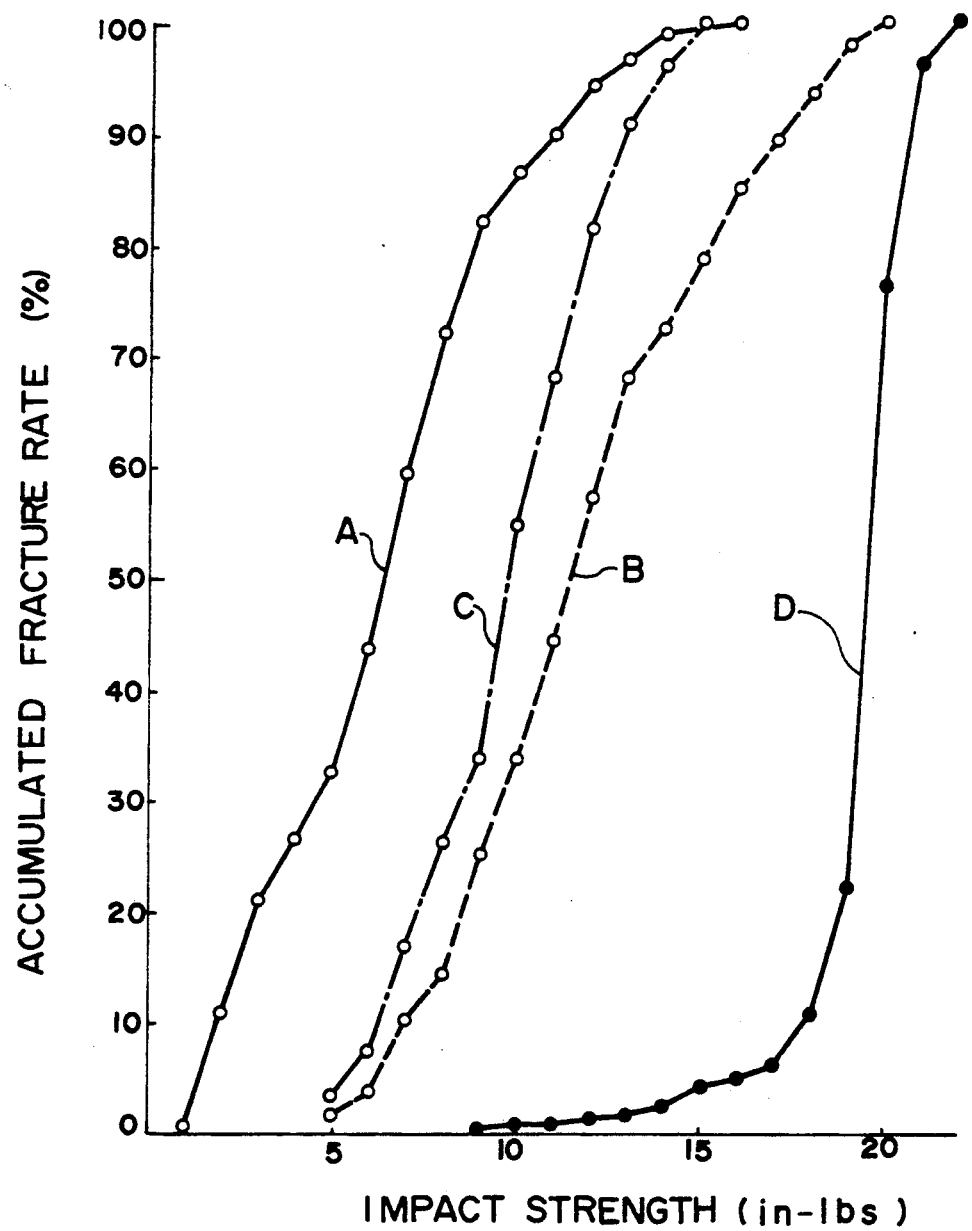

METHOD FOR MANUFACTURING A GLASS CONTAINER HAVING A LARGE IMPACT STRENGTH USING PERMANENT AND NON PERMANENT COATINGS ON THE APPARATUS

BACKGROUND OF THE INVENTION

1. Field of the Invention

The present invention relates to a method for manufacturing a glass container capable of increasing the impact strength of the glass container.

2. Description of the Prior Art

In a conventional method for manufacturing glass containers using an individual section machine, for the purpose of easily separating a formed glass container from molds including a blank mold, a neck ring, and a baffle, the molds are oiled at intervals, for example at a rate of once per twenty to sixty minutes.

However, there are the following drawbacks in the conventional glass container manufacturing method. More particularly, graphite included in the lubrication oil adheres to a plunger for forming parisons and the adhering graphite in turn shifts from the plunger to a parison during the press process thereby causing defects in the inside surface of the glass container. Further, when heated, the lubrication oil tends to generate bubbles which will cause defects in the inside surface of the glass container. These defects caused at the inside surface of the glass container not only decrease the impact strength of the glass container but also cause the impact strength of the glass container to fluctuate.

SUMMARY OF THE INVENTION

An object of the invention is to provide a glass container manufacturing method whereby an impact strength of a glass container is increased and stabilized.

This object can be attained by a method for manufacturing a glass container in accordance with the present invention which includes the steps of preparing a plunger coated with a ceramic coating or a sprayed metal coating of self-fluxing alloy or both coatings on at least one portion of a surface of the plunger, forming a lubrication carbon layer on surfaces of molds including a blank mold and a neck ring by periodically injecting flames of at least one kind of gaseous hydrocarbon having a carbon to hydrogen ratio more than 0.75, producing a parison using the plunger, the blank mold and the neck ring, and blow-forming the parison to a glass container of a final configuration.

In the present invention, a lubrication oil film which is formed on molds in the conventional method is replaced by the carbon layer formed through flame injection of at least one kind of gaseous hydrocarbon. Due to this carbon layer, bubbles from an oil film are not generated and graphite shifting from oil to the plunger and in turn from the plunger to the parison does not occur. As a result, the impact strength of a glass container is greatly improved.

Further, because the plunger is coated with a coating of ceramics or self-fluxing alloy or both, the oxidation of the surface portion of the plunger is prevented so that flaking of the oxidized layer and the subsequent mixing into the parison will not occur. This also increases the impact strength of the glass container.

Furthermore, since both the carbon layer formation and the plunger coating are applied in the present invention, a greater impact strength stabilizing effect (a synergism) can be obtained than with a summation of the stabilizing effect due to the carbon layer formation only and the stabilizing effect due to the plunger coating only.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 3 is a front elevational view of a plunger coated with a ceramic coating, which can be used in the method in accordance with the first embodiment of the invention;

FIG. 4 is a front elevational view of a plunger coated with a sprayed metal coating of self-fluxing alloy, which can be used in the method in accordance with the first embodiment of the invention;

FIG. 5 is a front elevational view of a plunger coated with both a ceramic coating and a self-fluxing alloy coating, which can be used in the method in accordance with a second embodiment of the invention;

FIG. 6 is a graph illustrating a relationship between an accumulated fracture rate and impact strengths of glass containers manufactured in accordance with the method of the first embodiment of the invention;

DETAILED DESCRIPTION OF THE PREFERRED EMBODIMENTS

First Embodiment

Figure 1:
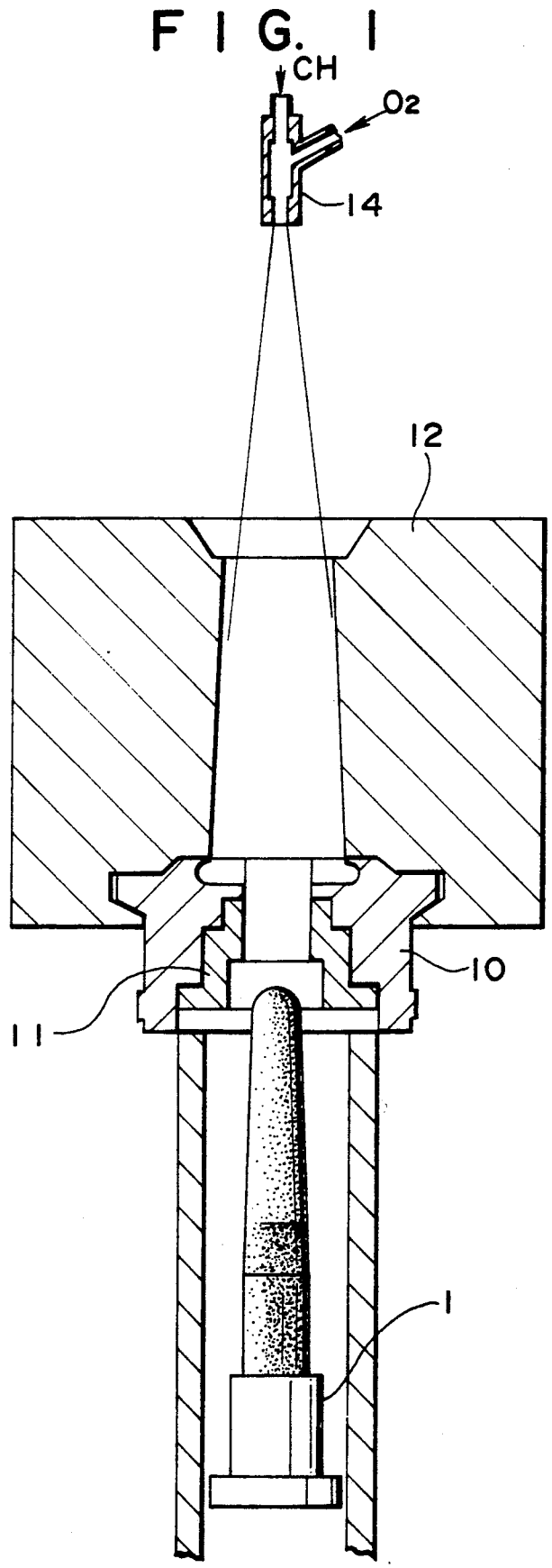
FIG. 1 is a cross-sectional view of one section of an individual section machine illustrating that molds are being formed with a carbon layer using a glass container manufacturing method in accordance with a first embodiment of the invention.

FIGS. 1 to 4 illustrate an apparatus and portions thereof used in a glass container manufacturing method in accordance with a first embodiment of the invention. In FIG. 1 which illustrates one section of an individual section machine, a plunger 1 is provided which is movable relative to a blank mold 12, a neck ring 10, and a guide ring 11 so that the plunger 1 can form an inside configuration of a parison when the plunger 1 pushes a gobbet of glass inserted in the blank mold 12. When the blank mold 12 is opened, that is, when a baffle 13 (see FIG. 2) is dismounted from the blank mold 12, a nozzle 14 located above the blank mold 12 injects flames of at least one kind of gaseous hydrocarbon thereby forming a film-like lubrication carbon layer on surfaces of the blank mold 12, the neck ring 10, and the guide ring 11. The hydrocarbon or hydrocarbons supplied to the nozzle 14 include a hydrocarbon with a carbon to hydrogen ratio of more than 0.75, for example acetylene. A pilot firing device continuously operates and the gaseous hydrocarbon is injected to the pilot firing device to be thermally cracked quickly and to form a carbon layer on the inside surfaces of the molds including the blank mold 12 and the neck ring 10.

A portion of the plunger 1 which will be brought into contact with a gobbet of glass is coated beforehand with a ceramic coating 3 constructed of at least one kind of ceramics selected from the group of TiN, TiC, TiCN, $TiB_2$, SiC, and $Al_2O_3$, or a sprayed metal coating 2 constructed of at least one kind of self-fluxing alloy selected from cobalt series alloys including cobalt series $Cr_3C_2$. These coatings 2 and 3 are an oxidation-proof coating.

Figure 2:
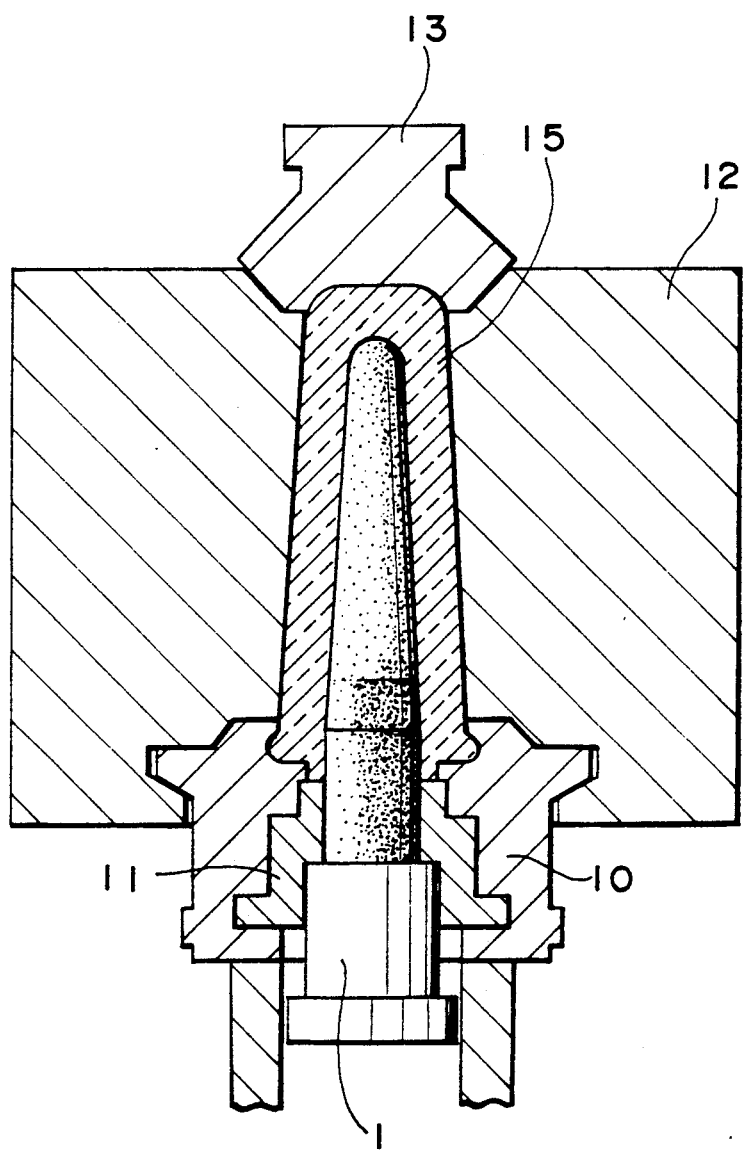
FIG. 2 is a partial, cross-sectional view of the machine of FIG. 1 illustrating a parison is being manufactured using the method in accordance with the first embodiment of the invention.

Then, as illustrated in FIG. 2, a parison 15 is manufactured using the plunger coated with the ceramic coating 3 (FIG. 3) or the sprayed metal coating 2 (FIG. 4) of self-fluxing alloy. The molds are formed with the carbon layer through flame injection of at least one kind of gaseous hydrocarbon. Then, the parison 15 is blow-formed to a glass container with a final configuration.

In the above-described glass container manufacturing method, both formation of the oxidation-proof coating on the surface of the plunger 1 and formation of the carbon layer on the surfaces of the molds should be used.

Due to the formation of the ceramic coating 3 or the self-fluxing alloy coating 2 on the surface of the plunger 1, oxidation of a surface portion of the plunger 1 is prevented so that flaking of any oxidized layer from the plunger 1 and mixing of oxidized metal powders into a parison does not occur and therefore, reduction of impact strength of the glass container due to mixing of the metal powders does not occur. Further, since the carbon layer is formed not through oiling but through flame injection of the gaseous hydrocarbon or hydrocarbons, reduction of the impact strength of the glass container due to bubbles which are generated in the case of oil can be prevented.

Impact strength tests were executed using vial glass containers having a volume of 200 cc and a thickness of 2.2 mm. The test results are shown in TABLE 1. In TABLE 1, method A corresponds to the conventional method including an oiling, method B (a comparison, and not to be included in the present invention) corresponds to a case where only a carbon layer formation was executed, method C (a comparison, and not to be included in the present invention) corresponds to a case where only a plunger coating formation was executed, and method D corresponds to the present invention where both the carbon layer formation and the plunger coating formation were executed.

TABLE 1

|  | Average (in-lbs) | Fluctuation (in-lbs) |
|---|---|---|
| Method A (Conventional) | 7 | 1–16 |
| Method B | 12 | 5–20 |

TABLE 1-continued

|  | Average (in-lbs) | Fluctuation (in-lbs) |
|---|---|---|
| (Comparison) Method C (Comparison) | 10 | 5–15 |
| Method D (The Present Invention) | 20 | 9–22 |

As will be understood from TABLE 1, by executing both the plunger coating and the carbon layer formation, the average impact strength was doubled and the fluctuation of the impact strength was greatly reduced. In addition, the lower limit of the dispersed impact strengths was raised.

FIG. 6 illustrates a relationship between an accumulated fracture rate and impact strengths of glass containers, wherein references A, B, C, and D correspond to the references of TABLE 1. As can be understood from D in FIG. 6, the fluctuation or dispersion range of the impact strengths of the glass containers manufactured according to the present invention is very small and the lower limit of the dispersion range is raised. TABLE 1 and FIG. 5 together show that there is a synergism in the increase in the impact strength and in the reduction of the dispersion range of the impact strengths in accordance with the present invention as compared with methods B and C.

Second Embodiment

In a second embodiment, the oxidation-proof coating to be formed on the plunger is changed to a coating structure shown in FIG. 5. Since other structures are the same as those of the first embodiment, like members are denoted with like reference numerals with respect to the first and the second embodiments. As illustrated in FIG. 5, the plunger 1 includes a first portion for forming a mouth portion (an opening portion) of a parison and a remaining, second portion. The first portion of the plunger 1 is coated with a sprayed metal coating 2 of self-fluxing alloy having a hardness less than Vickers hardness 800, and the second portion is coated with a ceramic coating 3. The self-fluxing alloy and the ceramics were discussed in the first embodiment.

Using a plunger the entire surface of which is coated with Ni series self-fluxing alloy (see FIG. 4) may cause an oxidized layer to form, though very small, on the surface of the plunger when the plunger contacts a gobbet of glass at high temperatures. The oxidized layer may be flaked from the plunger and adheres to a parison so that a defect is caused at an inside surface of the parison. When the glass container is cooled after blow forming of the glass container, cracks will initiate at the foreign substances due to a thermal expansion difference between metal and glass.

In contrast, in a case where the entire surface of the plunger is coated with a ceramic coating 3, the above-described flaking of an oxidized layer does not occur because a ceramic coating is a high oxidation-proof material. However, since the ceramic coating has a very high hardness, for example, a hardness greater than Vickers hardness 1000, the inside surface of the mouth portion of the glass container is often scratched by the plunger when the plunger is lowered, so that defects having lengths of several hundred microns are caused at the inside surface of the glass container. Since the mouth portion of the glass container usually has a thick wall, the defects caused in the mouth portion will not decrease the impact strength of the glass container. However, the defects caused at the mouth portion of the glass container reflect light and degrade the economic value of the glass container.

In the second embodiment, since the first portion of the plunger is coated with a self-fluxing alloy coating and the second portion is coated with a ceramic coating, defects which may be caused at a mouth portion of a glass container in the manufacturing method according to the first embodiment, will be prevented. More particularly, though the second portion or tip portion of the plunger is brought into contact with a gobbet of glass at high temperatures more than 1,000° C., the ceramic coating can endure the high temperature and the surface of the second portion of the plunger is not oxidized. Since the first portion of the plunger is heated to a relatively low temperature, for example 500° C., the self-fluxing alloy can endure the temperature. Since a self-fluxing alloy having a hardness lower than Vickers hardness 800 is selected for the material of the coating of the first portion of the plunger, the mouth portion of the glass container will not be scratched by the first portion of the plunger.

For the purpose of confirming the effects due to the second embodiment, tests were executed. Plunger A (included in the second embodiment), Plunger B (included in the second embodiment), and Plunger C (comparison, included in the first embodiment) were prepared. With respect to plunger A, the first portion was coated with a coating of Cr-Ni-B series self-fluxing alloy and the second, tip portion was coated with a coating of TiN. With respect to plunger B, the first portion was coated with a coating of Cr-Ni-B series self-fluxing alloy and the second portion was coated with $Al_2O_3$. With respect to plunger C, the entire surface of the plunger was coated with a coating of self-fluxing alloy. Plungers A, B and C were mounted to different sections of the same individual section machine, and press and blow forming of juice glass containers having a volume of 300 ml were continuously executed. The test results are shown in TABLE 2.

TABLE 2

| Impact Strength | Plunger A (in-lbs) | Plunger B (in-lbs) | Plunger C (in-lbs) |
|---|---|---|---|
| Minimum | 9 | 10 | 2 |
| Maximum | 21 | 22 | 12 |
| Average | 14.3 | 17.5 | 8.3 |
| Durability | 120 hr | 120 hr | 48 hr |

Further, plunger D (comparison), the entire surface of which was coated with a coating of TiN, was prepared. Plunger A (the second embodiment) and plunger D (comparison) were mounted to different sections of the individual section machine, and press and blow forming of juice glass containers (X) with a mouth portion of a small diameter and juice glass containers (Y) with a mouth portion for a one touch cap were executed using the plungers A and D. The rate of generation of inferior goods was observed over two days. The test results are shown in TABLE 3.

TABLE 3

| | Plunger A (Second Embodiment) | Plunger D (Comparison) |
|---|---|---|
| Glass container X | 0% | 10-15% |
| Glass container Y | 0% | 7-9% |

As will be understood from TABLE 2 and TABLE 3, in accordance with the second embodiment, defects generated at the inside surface of the mouth portion of the glass container can be greatly suppressed, while the impact strength of the glass container is maintained at the same level as the strength obtained by the first embodiment.

Third Embodiment

Figure 7:
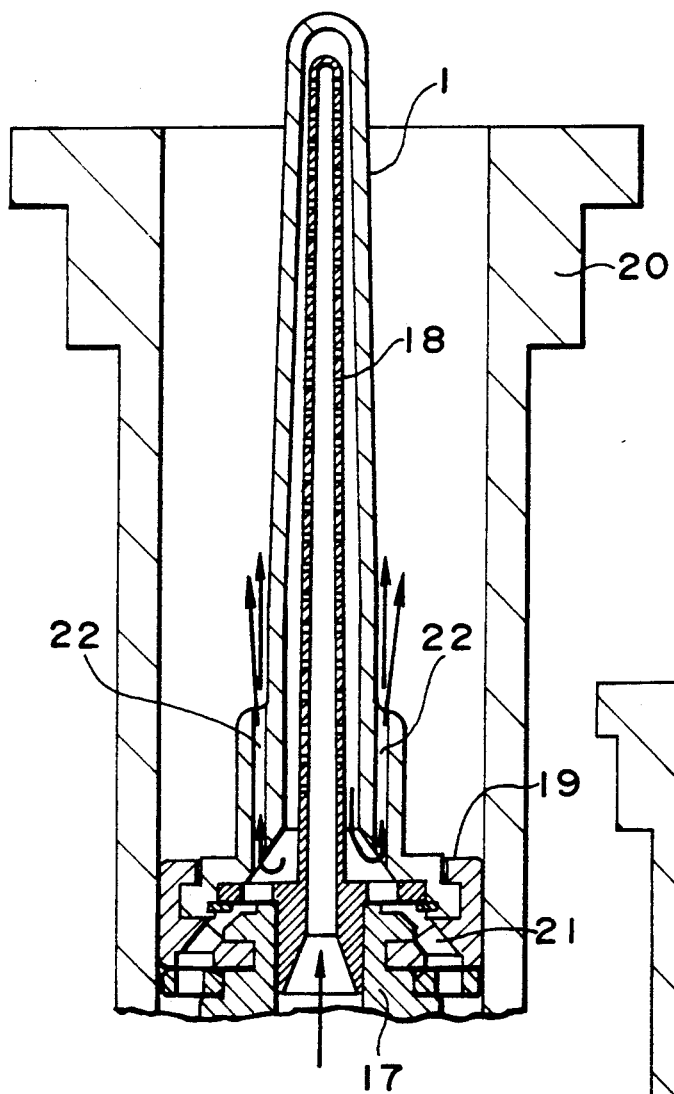
FIG. 7 is a cross-sectional view of one section of an individual section machine illustrating that air is being blown out from vertically extending holes to form an air curtain in a glass container manufacturing method in accordance with a third embodiment of the invention.
Figure 8:
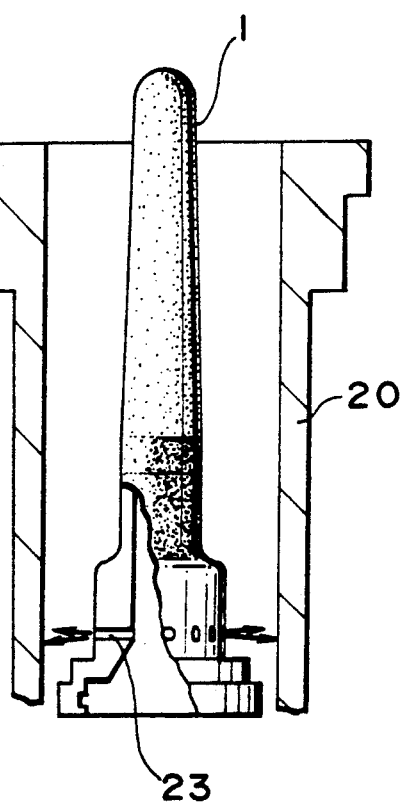
FIG. 8 is a cross-sectional view of one section of an individual section machine illustrating that air is being blown out from horizontally extending holes to form an air curtain in the method in accordance with the third embodiment of the invention.

FIGS. 7 and 8 illustrate the plunger used in the third embodiment of the invention. Since the structures other than the plunger are the same as those of the first embodiment, like members are denoted with like reference numerals.

In the third embodiment, the plunger 1 is held below a position located by 20 mm above the top of a positioner 20 for guiding the upward and downward movements of the plunger 1. Further, air is blown out from a base portion of the plunger 1 to thereby form an air curtain which covers the plunger 1.

The air curtain is formed in order to prevent foreign substances from attaching to the outside surface of the plunger 1. Since the air is blown out from the base portion of the plunger 1, the air can protect almost all portions of the plunger 1. If the air were blown out from a portion near the top of the plunger, the lower portion of the plunger could not be covered by the air curtain. The reason why the plunger 1 is held below the position located 20 mm above the positioner is that, below this limit, the air curtain is well maintained up to the top of the plunger and can cover the entire portion of the plunger.

With reference to FIG. 7, structures of an apparatus for executing the method according to the third embodiment will be explained in more detail. The plunger 1 is coupled to a head 17 of a drive mechanism (a drive mechanism for driving the plunger in a vertical direction) via a split ring 19 so that the plunger 1 and a cooling pipe 18 installed within the plunger 1 can be driven inside positioner 20 into a space defined by the blank mold and the neck ring to press and form the parison. Holes 21 are formed in the split ring 19. Compressed air supplied from a lower portion of the positioner 20 flows from the cooling pipe 18 into a space defined in the plunger 1 to cool the plunger 1 from the inside thereof and then is exhausted through the holes 21.

A plurality of vertically extending holes 22 are formed in the base portion of the plunger 1. One portion of the cooling compressed air is blown out through the vertical holes 22 to form the aforementioned air curtain.

The vertically extending holes 22 may be replaced by a plurality of horizontally extending holes 23 (which may be horizontally and upwardly extending holes) as illustrated in FIG. 8. The air blown out from the holes 23 collides with an inside surface of the positioner 20 and turns in an upward direction. Due to the collision, the air curtain is formed more evenly around the plunger 1 than in the case of the vertically extending holes.

For the purpose of keeping the air clean, a filter may be installed in the plunger mechanism. Further, to cover the entire outside surface of the plunger 1, the speed of a current of the air curtain is selected at a speed larger than 0.5 m/sec and preferably at a speed within the range of 1 to 3 m/sec.

To confirm the effects of the third embodiment, tests were executed using an individual section machine having the plunger mechanism shown in FIG. 7 to execute pressing and blow forming of glass containers with a thin thickness having a weight of 170 g and a volume of 300 cc. The speed of a current of the air curtain was 2.5 m/sec at the top of the positioner. The top of the plunger is adjusted in position to be located above the top of the positioner by 20 mm. Measuring the impact strengths of ten glass containers, it was found that the average impact strength was 19.0 in-lbs and the range of fluctuation of the impact strengths was 15.0 in-lbs to 20.3 in-lbs. In a case where no air curtain was formed, it was found that the average impact strength was 7.7 in-lbs and the range of fluctuation of the impact strengths was 4.0 in-lbs to 9.0 in-lbs. From these test results, it can be understood that the impact strength of a glass container can be increased by 2.5 times as compared with a case where no air curtain is formed.

Fourth Embodiment

Figure 9:
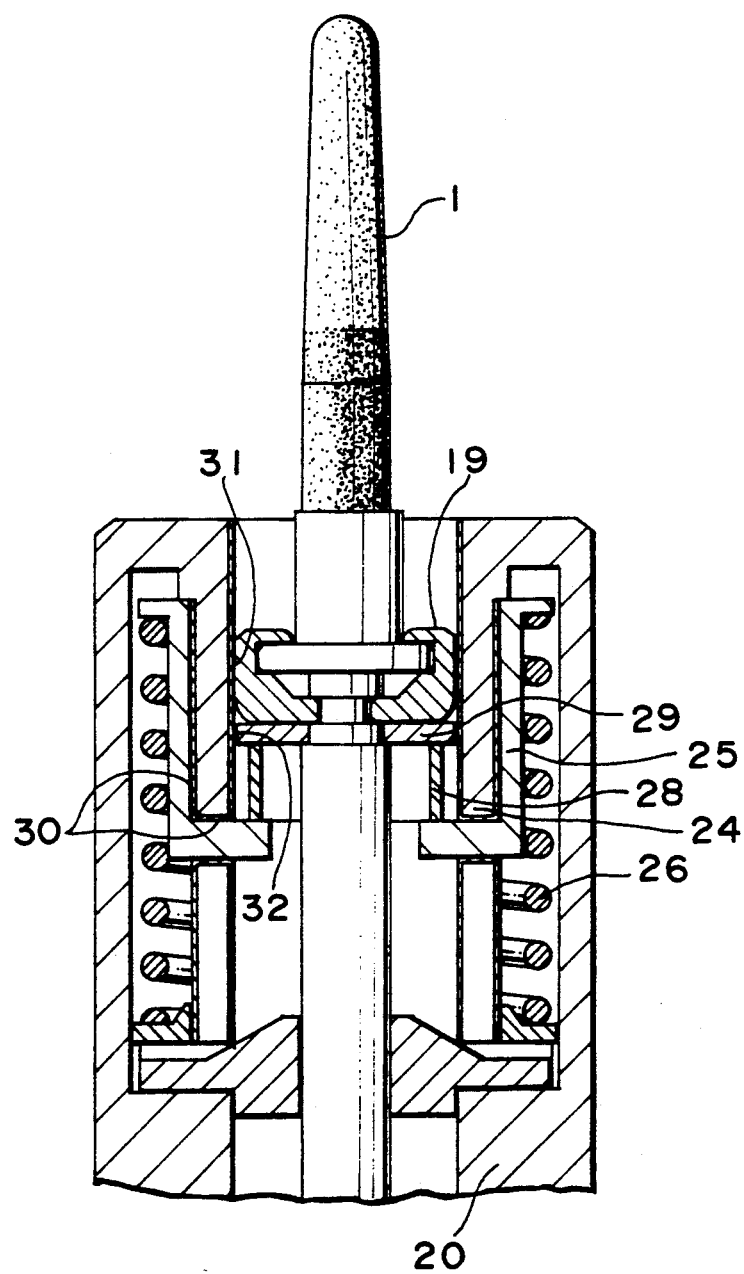
FIG. 9 is a cross-sectional view of an apparatus for executing a glass container production method in accordance with a fourth embodiment of the invention.

FIG. 9 illustrates an apparatus for executing a method in accordance with a fourth embodiment of the invention. In the fourth embodiment, the positioner 20 includes a bushing 24 and a spring guide 25. An abrasion-proof layer 30 is formed on the sliding surfaces between the bushing 24 and the spring guide 25 so that dusts are prevented from being generated from abrasion of the sliding surfaces. Metal dusts would decrease the impact strength of a glass container.

More particularly, the abrasion-proof layer 30 is constructed of ceramics, for example, TiN, TiC, SiC, or $Al_2O_3$. This layer 30 has a Vickers hardness greater than 1000 at a room temperature. Though the positioner 20 itself is constructed of iron, the abrasion-proof layer 30 greatly increases the abrasion-proof characteristics of the positioner 20. Even if glass powders (with a Vickers hardness of Hv 500) and iron powders (with a Vickers hardness of Hv 200 to 800) invade into the sliding surfaces, the sliding surfaces are not scratched, because the hardness of the abrasion-proof layer 30 is greater than that of these powders. Further, the sliding surfaces constructed of ceramics will prevent the sliding surfaces from sticking to each other, which would occur if the sliding surfaces were constructed of metal.

The sliding surfaces between the split ring 19 and the bushing 24 are preferably formed with similar abrasion-proof layers 31, and also the sliding surfaces between a washer 29 and the bushing 24 are preferably formed with abrasion-proof layers 32.

For the purpose of confirming the effects of the fourth embodiment, the above-described positioner was mounted to one of the eight sections of the individual section machine, and press and blow forming of juice glass containers having the volume of 180 cc was executed. The metal powder generation rate of the one section and that of a section mounted with a conventional positioner were examined.

The results of this test showed that the metal powder generation rate at the other section mounted with the conventional positioner was 4.7% per 72 hours, while the metal powder generation rate at the one section mounted with the positioner in accordance with the fourth embodiment of the invention was 0.09% per 0.5 months. The glass container production was continued using the one section mounted with the positioner in accordance with the fourth embodiment of the invention, and when one month elapsed, no increase in the metal powder generation rate was seen.

The main features of the invention are in the combination of the means of forming a carbon layer through flame injection of gaseous hydrocarbons and the means of forming an oxidation-proof layer on the plunger which were discussed in the first embodiment, and the means for further increasing the impact strength of glass containers as discussed in the second, third, and fourth embodiments.

Figure 10:
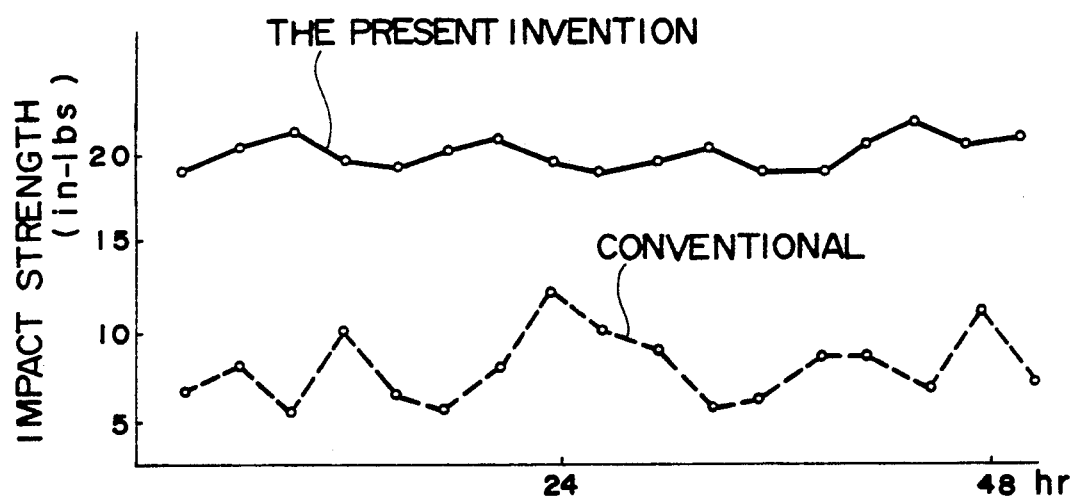
FIG. 10 is a graph illustrating impact strengths of glass containers manufactured in accordance with all the methods of the first through fourth embodiments of the invention compaired to impact strengths of glass containers manufactured in accordance with conventional methods.

The tests wherein the means of all the embodiments were applied to glass container production were executed using vial glass containers having a volume of 200 cc and a thickness of 2.2 mm, and the test results are shown in FIG. 10. The test results according to the conventional method are shown also in FIG. 10 for comparison. As is apparent from FIG. 10, the impact strength of the glass containers manufactured according to the method of the invention was twice that of the glass containers manufactured according to the conventional method and the fluctuation of the impact strength was reduced so that reliability of the strength of glass containers was greatly improved.

According to the invention, the following effects can be obtained.

First, the fluctuation of the impact strength of glass containers is reduced so that the reliability of the glass container strength is greatly improved.

Second, the impact strength of the glass containers is increased by about twice.

Although a few embodiments of the invention have been described in detail above, it will be appreciated by thosed skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A method for manufacturing a glass container comprising the steps of:

providing a plunger having a first portion for forming a mouth portion of a parison and a remaining second portion, the first portion of the plunger being coated with a sprayed metal coating of self-fluxing alloy having a hardness less than Vickers hardness 800 and the second portion being coated with a ceramic coating;

forming a lubrication carbon layer on surfaces of molds including a blank mold and a neck ring by periodically injecting flames of gaseous hydrocarbon having a carbon to hydrogen ratio more than 0.75;

supplying a gobbet of glass to the blank mold;

producing the parison from the gobbet of glass, using the plunger, the blank mold and the neck ring; and blow-forming the parison to a glass container of a final configuration.

2. A method for manufacturing a glass container according to claim 1, wherein the ceramic coating is constituted of material selected from the group consisting of TiN, TiC, TiCN, $TiB_2$, and $Al_2O_3$.

3. A method for manufacturing a glass container according to claim 1, wherein the self-fluxing alloy is cobalt series $Cr_3C_2$.

4. A method for manufacturing a glass container according to claim 1, wherein the hydrocarbon is acetylene.

5. A method for manufacturing a glass container according to claim 1, wherein the self-fluxing alloy coated on the first portion of the plunger is Cr-Ni-B series self-fluxing alloy and the ceramic coated on the second portion of the plunger is TiN or $Al_2O_3$.

6. A method for manufacturing a glass container according to claim 1, wherein the plunger is held below a position located 20 mm above a top of a positioner for guiding the plunger and air is blown out from a base portion of the plunger thereby forming an air curtain around the plunger.

7. A method for manufacturing a glass container according to claim 6, wherein a speed of a current of the air curtain is at least 0.5 m/sec.

8. A method for manufacturing a glass container according to claim 7, wherein the speed of the current of the air curtain is in the range of 1 to 3 m/sec.

9. A method for manufacturing a glass container according to claim 6, wherein a plurality of vertically extending holes are formed in the base portion of the plunger and the air is blown out through the vertically extending holes.

10. A method for manufacturing a glass container according to claim 6, wherein a plurality of horizontally extending holes are formed in the base portion of the plunger and the air is blown out through the horizontally extending holes.

11. A method for manufacturing a glass container according to claim 1, wherein the plunger is guided by a positioner which includes a bushing and a spring guide slidingly contacting each other at sliding surfaces thereof, at least one of the sliding surfaces being coated with an abrasion-proof layer.

12. A method for manufacturing a glass container according to claim 11, wherein the abrasion proof layer is constructed of material selected from the group consisting of TiN, TiC, and $Al_2O_3$.

* * * * *